United States Patent [19]
Chen et al.

[11] Patent Number: 5,911,860
[45] Date of Patent: Jun. 15, 1999

[54] SOLID ELECTROLYTE MEMBRANE WITH MECHANICALLY-ENHANCING CONSTITUENTS

[75] Inventors: Chieh Cheng Chen, Getzville; Ravi Prasad, East Amherst, both of N.Y.

[73] Assignee: Praxair Technology, Inc., Danbury, Conn.

[21] Appl. No.: 08/775,683

[22] Filed: Dec. 31, 1996

[51] Int. Cl.$^6$ ................................................ C25B 13/00
[52] U.S. Cl. ..................... 204/295; 204/421; 204/252; 429/191; 429/193; 429/33
[58] Field of Search .................................. 204/421, 295, 204/252; 252/500, 513, 514, 515, 518, 519, 520, 521; 429/191, 193, 33

[56] References Cited

U.S. PATENT DOCUMENTS

| | | | |
|---|---|---|---|
| 5,160,713 | 11/1992 | Mazanec et al. | 423/210 |
| 5,240,480 | 8/1993 | Thorogood et al. | 96/4 |
| 5,306,411 | 4/1994 | Mazanec et al. | 204/265 |
| 5,470,821 | 11/1995 | Wong et al. | 505/236 |
| 5,478,444 | 12/1995 | Liu et al. | 204/59 |
| 5,534,471 | 7/1996 | Carolan et al. | 502/4 |
| 5,569,633 | 10/1996 | Carolan et al. | 502/4 |
| 5,582,710 | 12/1996 | Mairesse et al. | 204/421 |
| 5,591,315 | 1/1997 | Mazanec et al. | 204/295 |
| 5,616,223 | 4/1997 | Shen et al. | 204/295 |
| 5,624,542 | 4/1997 | Shen et al. | 204/295 |
| 5,648,304 | 7/1997 | Mazanec et al. | 501/134 |
| 5,712,220 | 1/1998 | Carolan et al. | 502/400 |
| 5,723,035 | 3/1998 | Mazanec et al. | 204/295 |

FOREIGN PATENT DOCUMENTS 61-21717  1/1986  Japan .

OTHER PUBLICATIONS

Genouel et al., "On the Cubic Perovskites $La_{0.2}Sr_{0.8}Cu_{0.4}M_{0.6}O_{3-y}$ (M=Co,Fe)", Journal of Solid State Chemistry, pp. 260–270 (1995) No month available.

Yamamoto et al., "Perovskite–Type Oxides as Oxygen Electrodes for High Temperature Oxide Fuel Cells", Solid State Ionics, pp. 241–246 (1986). No month available.

B. Fu et al., $Y_{1-x}Ca)FeO_3$: *A Potential Cathode Material for Solid Oxide Fuel Cells*, Ed. Singhal et al., The Electrochemical Soc. Proc. 93–4: 276–287 (1993). No month available.

Chen et al., "Microstructural Development, Electrical Properties and Oxygen Permeation of Zirconia–palladium Composites", Solid State Ionics, 76: 23–28 (1995). No month available.

*Primary Examiner*—Bruce F. Bell
*Attorney, Agent, or Firm*—Douglas E. Denninger

[57] ABSTRACT

A solid electrolyte ion transport membrane comprising a matrix material which conducts at least one type of ion such as oxygen ions, and at least one constituent which is physically distinct from the matrix material and which enhances the mechanical properties, the catalytic properties and/or the sintering behavior of the matrix material. The constituent is present in a manner which precludes continuous electronic conductivity through the constituent across the membrane.

11 Claims, 5 Drawing Sheets

SOLID ELECTROLYTE MEMBRANE WITH MECHANICALLY-ENHANCING CONSTITUENTS

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to compositions of solid electrolyte ion transport membranes and more particularly to such membranes having one or more constituents which enhance mechanical properties, catalytic properties and/or sintering behavior of the membranes.

BACKGROUND OF THE INVENTION

Solid electrolyte ion transport membranes appear to have significant potential for the separation of oxygen from gas streams containing oxygen. Of particular interest are mixed conductor materials that conduct both oxygen ions and electrons and which can hence be operated in a pressure driven mode without the use of external electrodes. Composite ceramic mixed conductor membranes comprised of multi-phase mixtures of an electronically-conductive material and an oxygen ion conductive material are disclosed by T. J. Mazanec et al. in U.S. Pat. No. 5,306,411 for electrochemical reactors and partial oxidation reactions. M. Liu et al. disclose in U.S. Pat. No. 5,478,444 composite mixed conductor materials containing oxygen-ion-conducting materials such as bismuth oxide and electronically conductive materials. True mixed conductors, exemplified by perovskites such as $La_{0.2}Sr_{0.8}CoO_x$, $La_{0.2}Sr_{0.8}FeO_x$, $La_{0.2}Sr_{0.8}Fe_{0.8}Co_{0.1}Cr_{0.1}O_x$ and others, are materials that possess intrinsic conductivity for both electrons and ions. Some of these materials possess among the highest oxygen ion conductivity known and also rapid surface exchange kinetics.

Although there is great potential for these materials in gas separation applications, there are some drawbacks in their use. A common problem of most ceramics is their fragility and low mechanical strength in tension which makes it difficult to fabricate large elements such as tubes and deploy them in high reliability commercial systems.

Yamamoto et al. reported the microcracking in sintered $LaCoO_x$ in *Perovskite-Type Oxides as Oxygen Electrodes for High Temperature Oxide Fuel Cells*, Solid State Ionics 22:241–46 (1987). Such microcracks are probably related to structural transformations during sintering and frequently occur in perovskites. The vacancy concentration in many ion transport membrane materials such as perovskites is a function of the oxygen partial pressure in the gas surrounding it. Since the unit cell size is dependent on the vacancy concentration, in many ion transport membrane materials the volume of the unit cell increase as $P_{O2}$ is reduced. For example, in perovskites the size of the unit cell $ABO_3$ increases as the partial pressure of oxygen on the anode or permeate side is reduced. The change is unit cell size gives rise to a compositional coefficient of expansion in addition to the thermal coefficient of expansion. Compositional gradients in the materials hence give rise to mechanical stress which could result in failure. This often necessitates close control of atmosphere during startup, shutdown operation or processing.

B. Fu et al. reported in $(Y_{1-x}Ca_x)FeO_3$: *A Potential Cathode Material for Solid Oxide Fuel Cells*, Proc. 3rd Intl. Symp. on Solid Oxide Fuel Cells, S. C. Singhal, Ed., The Electrochem. Soc. Vol. 93-4: 276–282 (1993) that microcracking was a problem in $Y_{1-x}(Sr$ or $Ca)_xMnO_3$ perovskites due to either a high temperature polymorphic symmetry change, or a highly anisotropic thermal expansion coefficients of the system. Efforts made to circumvent this problem were unsuccessful. They found that high Sr or Ca doping levels (x>0.3) can reduce the microcracking, but resulted in poor performance for fuel cell cathode applications apparently due to inferior physical properties including reduced ionic conductivities.

Because of the difficulties described above, the manufacture of perovskite tubes has required complex, carefully controlled process steps sometimes involving a sophisticated, controlled atmosphere sintering process. This increases the cost and complexity of fabrication and could result in problems during transient operation of the manufactured elements involving temperature, atmospheric or compositional changes.

It is highly desirable to minimize the sensitivity of the ion transport membrane to the ambient atmosphere. Also, many of these materials have very high thermal expansion coefficient (for example, $La_{1-x}Sr_xCoO_3$ is approximately $20 \times 10^{-6}/°$ C.), which gives rise to high thermal stress during the processing and operation, hence often results in the failure of materials.

In summary, the use of the composite mixed conductors in the prior art is mostly confined to materials comprising multi-phase mixtures of oxygen ion conductors and electronic conductors. The sole objective in the prior art was to introduce electronic conductivity into the ionic conductor. In general this requires the electronically conductive second phase to be present in greater than 30% to 35% by volume when randomly distributed to enable operation above the percolation limit.

Composite bulk superconducting materials have been synthesized to achieve desirable physical properties and high $T_c$ superconducting characteristics. Wong et al. in U.S. Pat. No. 5,470,821 describe composite bulk superconducting materials with continuous superconducting ceramic and elemental metal matrices. The elemental metal is situated within the interstices between the crystalline grains to increase transport current density.

OBJECTS OF THE INVENTION

It is therefore an object of the invention to provide an improved solid electrolyte ion transport membrane having enhanced mechanical properties.

It is a further object of this invention to provide such a membrane which minimizes microcracks during its fabrication.

Yet another object of this invention is to provide such a membrane which does not require a special atmosphere during its processing or operation.

A still further object of this invention is to provide such a membrane which adapts to changes in temperature and atmosphere.

Yet another object of this invention is to provide such a membrane which may exhibit improved surface exchange rates.

SUMMARY OF THE INVENTION

This invention comprises a solid electrolyte ion transport membrane having a matrix material which conducts at least one type of ion, preferably oxygen ions, and at least one constituent which is physically distinct from the matrix material and which enhances the mechanical properties, the catalytic properties, and/or the sintering behavior of the matrix material. The constituent is present in a manner which precludes continuous electronic conductivity through the constituent across the membrane.

In a preferred embodiment the matrix material is a mixed conductor which exhibits both electronic and oxygen ion conductivity. The constituent is preferably a metal such as silver, palladium, or a mixture thereof. In other embodiments, the constituent is a ceramic or other electrically nonconductive material.

BRIEF DESCRIPTION OF THE DRAWINGS

Other objects, features and advantages will occur to those skilled in the art from the following description of preferred embodiments and the accompanying drawings, in which:

FIG. 6b is a surface energy dispersed spectrum of the membrane shown in FIG. 6a.

DETAILED DESCRIPTION OF THE INVENTION

This invention may be accomplished by a solid electrolyte ion transport membrane comprising a matrix material which conducts at least type of ion, preferably oxygen ions, and at least one constituent which is physically distinct from the matrix material and which enhances the mechanical properties, the catalytic properties and/or the sintering behavior of the matrix material. The constituent is present a manner which precludes continuous electronic conductivity through the constituent across the membrane.

The invention thus relates to a multi-phase, composite material comprised preferably of a first mixed conductor phase such as a perovskite and a second constituent phase which can prevent microcracking during fabrication, eliminate special atmospheric control during processing and operation, and improve the mechanical properties, thermal cyclability, atmosphere cyclability and/or surface exchange rates over that of the mixed conductor phase alone.

The invention introduces a suitable second constituent phase into the mixed conductor to establish a composition with improved mechanical properties, and preferably with improved catalytic properties, without sacrificing its oxygen transport performance. This second phase can relieve compositional and other stresses generated during sintering, inhibit the propagation of microcracks in the mixed conductor phase and hence improve the mechanical properties (especially tensile strength) significantly. Since atmosphere control can be eliminated during sintering, it is easier and less costly to scale up manufacturing. The ability to eliminate atmosphere control during thermal cycling makes it substantially easier to deploy the membranes in practical systems which are more robust with respect to variation in temperature or gas composition.

The present invention is the first time, known to the inventors, that second phase materials have been introduced into perovskites, for example, specifically to reduce microcracking, eliminate atmosphere control during the fabrication, enhance mechanical strength and/or yield improved catalytic properties. By comparison, electrically conductive materials were added in conventional solid electrolyte ion transport membranes to accomplish electronic conduction with no regard to the impact on mechanical properties or catalytic properties, or sintering behavior.

Dense membranes of mixed conducting oxides that transport oxide ions have an infinite oxygen/nitrogen selectivity. Examples of such materials are given in Table I and include several oxides with a perovskite structure or a structure that can be derived from that such as $A_2B_2O_5$, a brownmillerite. A common problem of such ceramic membranes is their fragility and low mechanical strength in tension which makes it difficult to fabricate large elements such as tubes and use them in high reliability commercial systems. These limitations are overcome in the present invention using a dual phase material comprised of a mixed conductor such as a perovskite and a suitable second constituent phase such as a metal to prevent the microcracking during fabrication in air, improve the mechanical properties, enhance thermal/ atmosphere cyclability and possibly yield surface exchange rates over that of mixed conductor phase alone.

Suitable ion transport membrane materials include ionic only and mixed conductors that can transport oxygen ions. As used according to the present invention, the ion transport materials comprising the first phase preferably transport both oxygen ions and electrons independent of the presence of the second constituent phase. A more comprehensive description of first phase materials to which a second constituent phase may be added according to the present invention is provided below the Examples.

TABLE I

Mixed Conducting Solid Electrolytes

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq y \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_{0.2}Cu_3O_{7-\beta}$ ($0 \leq \beta \leq 1$, $\beta$ from stoichiometry)
4. $La_{0.2}Ba_{0.8}Fe_{0.2}O_{2.6}$, $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x", y, y', y" all in 0–1 range)
   where: A, A', A" = from groups 1, 2, 3 and f-block lanthanides
   B, B', B" = from d-block transition metals
6. (a) Co—La—Bi type:   Cobalt oxide         15–75 mole %
                        Lanthanum oxide      13–45 mole %
                        Bismuth oxide        17–50 mole %
   (b) Co—Sr—Ce type:   Cobalt oxide         15–40 mole %
                        Strontium oxide      40–55 mole %
                        Cerium oxide         15–40 mole %
   (c) Co—Sr—Bi type:   Cobalt oxide         10–40 mole %
                        Strontium oxide       5–50 mole %
                        Bismuth oxide        35–70 mole %
   (d) Co—La—Ce type:   Cobalt oxide         10–40 mole %
                        Lanthanum oxide      10–40 mole %
                        Cerium oxide         30–70 mole %
   (e) Co—La—Sr—Bi type: Cobalt oxide        15–70 mole %

TABLE I-continued

Mixed Conducting Solid Electrolytes

Material composition

|  |  |  |
|---|---|---|
|  | Lanthanum oxide | 1–40 mole % |
|  | Strontium oxide | 1–40 mole % |
|  | Bismuth oxide | 25–50 mole % |
| (f) Co—La—Sr—Ce type: | Cobalt oxide | 10–40 mole % |
|  | Lanthanum oxide | 1–35 mole % |
|  | Strontium oxide | 1–35 mole % |
|  | Cerium oxide | 30–70 mole % |

7. $(Bi_{2-x-y}M'_xM_yO_{3-\delta}$ ($0 \leq x \leq 1$, $0 \leq y \leq 1$, $\delta$ from stoichimetry) where: M' = Er, Y, Tm, Yb, Th, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-1}Gd_xO_{3-x/2}$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof
   B" represents Mn, Co, V, Ni or Cu, or a mixture thereof,
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and $0.9 < (s + t)/(u + v + w) < 1.1$
10. One of the materials $La_{1-x}Sr_xCu_{1-y}M_uO_{3-d}$ family, where:
    M represents Fe or Co;
    x equals from zero to about 1;
    y equals from zero to about 1;
    d equals a number that satisfies the valences of La, Sr, Cu, and M in the formula.
11. One of the materials of $Ce_{1-x}A_xO_{2-d}$ family, where:
    A represents a lanthanide, Ru, or Y; or a mixture thereof;
    x equals from zero to about 1;
    y equals from zero to about 1;
    d equals a number that satisfies the valences of Ce and A in the formula.
12. One of the materials of $Sr_{1-x}Bi_xFeO_{3-d}$ family, where:
    A represents a lauthanide or Y, or a mixture thereof;
    x equals from zero to about 1;
    y equals from zero to about 1;
    d equals a number that satisfies the valences of Ce and A in the formula.
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):
    $(Pd)_{0.5}/(YSZ)_{0.5}$
    $(Pt)_{0.5}/(YSZ)_{0.5}$
    $(B-MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

In general, the major considerations in the selection of the second constituent phase materials are: (1) thermal expansion coefficient (TEC) match between second phase and the ion transport material; (2) chemical compatibility between second phase and the ion transport material; (3) good bonding between the second phase and the matrix of the ion transport material; (4) the ductility of the second phase to release the stresses during sintering and cooling; and (5) low cost. TEC match is important because stresses are usually set up within and around the second phase as the composite material cools down from the fabrication. Selection of an incorrect second phase material may cause possible delamination or cracking by the thermal stresses induced during fabrication and operation. This can be minimized by reducing the difference in the two expansion coefficients between the ion transport material and the second phase.

Chemical compatibility is important because the high temperature operation and processing of ion transport materials will cause interactions and interdiffusion between the ion transport material and the second phase that may lead to the degradation of the materials and reduce the membrane performance. Therefore, the second phase should be chemically inert towards or should not react undesirably with the ion transport material to prevent adverse interactions and interdiffusion at high temperatures.

Good bonding is important because delaminations occurring between the second phase and the ion transport material could be deleterious to the strength of the material. Cracks or flaws could easily link up and cause a failure of the material.

Ductility of the second phase is important because many ion transport materials have very high thermal expansion coefficient. High TEC's give rise to high thermal stress during the processing and operation of the ion transport materials, which may result in failure of the materials. The ductility of the second phase may release the stresses generated during sintering and/or cooling.

In addition to the above considerations, the catalytic activity of the second phase preferably improves surface reaction kinetics of the composite ion transport membranes. Increased catalytic activity therefore may mitigate an otherwise higher cost for a given constituent.

The constituent phase according to the present invention is not electronically continuous across the ion transport membrane. However, the constituents may be physically continuous if formed of non-electronically-conductive materials. Randomly distributed electronically conductive constituents preferably are less than thirty percent by volume to ensure that such constituents are present in a manner below the percolation limit of electrons across the membrane.

The second phase can be chosen from metals, such as silver, palladium, platinum, gold, rhodium, titanium, nickel, ruthenium, tungsten, tantalum, or alloys of two or more of such metals which are stable at membrane operating temperatures. Suitable high-temperature alloys include inconel, hastelloy, monel, and bucrollol. Silver, palladium, or silver/palladium alloy are preferred. The second phase can be also chosen from ceramics, such as praseodymium-indium oxide mixture, niobium-titanium oxide mixture, titanium oxide, nickel oxide, tungsten oxide, tantalum oxide, ceria, zirconia, magnesia, or a mixture thereof. Some ceramic second phases, such as titanium oxide or nickel oxide, can be introduced in the form of oxides, then reduced to metal during the operation under a reduction atmosphere.

Other alternative ways to practice the invention include using physically continuous non-electronically-conductive second phases, such as glass, asbestos, ceria, zirconia or magnesia fibers or wires, or flakes of a material such as mica, to reinforce the ion transport matrix. The continuous second phase can be distributed substantially uniformly in the ion transport matrix, provide structural reinforcement and enhance the mechanical properties of the ion transport membrane. The fibers typically have a diameter less than one mm, preferably less than 0.1 mm, more preferably less than 0.01 mm and most preferably less than one micron. The aspect ratio (length to diameter) typically is greater than 10, preferably greater than 100, and more preferably greater than 1000.

The invention will now be described in detail with respect to a composite ion transport membrane containing a mixed conducting $La_{0.2}Sr_{0.8}Fe_{0.69}Co_{0.1}Cr_{0.2}Mg_{0.01}O_x$ and a silver/palladium alloy second phase.

EXAMPLE 1

Mechanically Enhanced Ion Transport Membrane of $La_{0.2}Sr_{0.8}Fe_{0.69}Co_{0.1}Cr_{0.2}Mg_{0.01}O_x$ and 50Ag/50Pd Alloy Mechanically enhanced ion transport materials were prepared by mixing various weight ratios (5, 10, and 20 wt %) of a Ag/Pd alloy 50% Ag and 50% Pd by weight, hereinafter 50Ag/50Pd, available from Degussa Corp., South Plainfield, N.J., and $La_{0.2}Sr_{0.8}Fe_{0.69}Co_{0.1}Cr_{0.2}Mg_{0.01}O_x$ mixed conductor powder from SSC, Inc., Woodinville, Wash., now PSC of Praxair Surface Technologies, Inc., using a Spex mixer (Spex Industries, Inc., Edison, N.J.), for 15–20 mins. The powders were then added into a 2-propanol solution containing 3 wt % of PVB (Butvar of Monsanto, St. Louis, Mo.), and mixed by a magnetic stirrer at 80° C. to evaporate the 2-propanol, then sieved through a mesh size of 74 microns before pressing. Mechanically enhanced membrane discs were prepared using a 1.5" die under a pressure of 10.4 kpsi followed by binder burn-out (1° C./min from 25 to 400° C. and hold for 1 hour), and sintered at 1250° C. for 2 hours with a heating/cooling rate of 2° C./min in air.

Microstructures of the sintered discs were examined by using an optical microscope and scanning electron microscope (SEM) with energy dispersed spectroscopy (EDS) for the chemical compositions analysis. X-ray diffraction (XRD) analysis were performed using a Rigaku miniflex diffractometer with Cu $K_\alpha$ radiation for the compatibility study of the second phase with the ion transport matrix. The mechanical strength was measured at room temperature by a 3-point bending test with a span of 19 mm and a cross-head speed of 0.5 mm/min using an Instron tensile testing machine. Samples (30×4×3 mm) were prepared by dry uni-axial pressing followed by cold isostatic pressing at 30 kpsi, then sintered at 1250° C. for 2 hours. All specimens were cut and polished using synthetic diamond discs prior testing to avoid any edge imperfections. The tests were performed on five specimens for each compositions. The oxygen permeation rate was measured using sintered disc specimens sealed in an alumina test cell with gold pastes. Permeations were performed at the temperature of 900–1000° C. with He inert gas purge and different reactive purge gases. A HP 5890 Gas Chromatography, oxygen analyzer and moisture analyzer were used to analyze the gas compositions and calculate the oxygen fluxes.

Figure 1A:
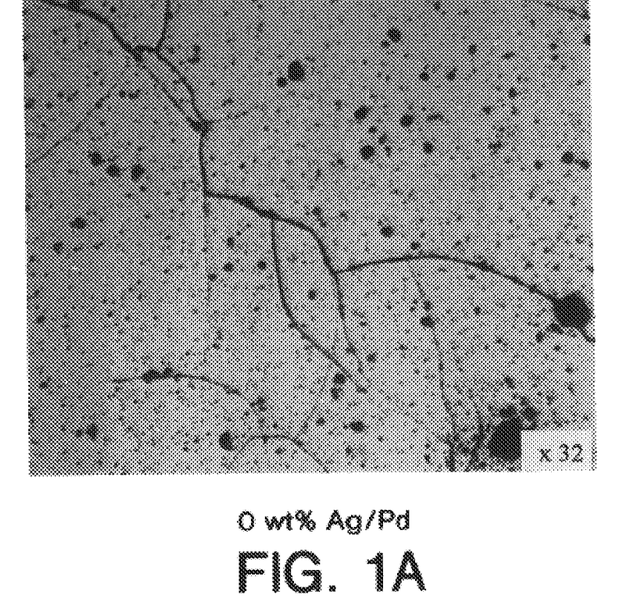
FIGS. 1a through 1d are enlarged photographs of membranes having different amounts of constituents according to the present invention.
Figure 1B:
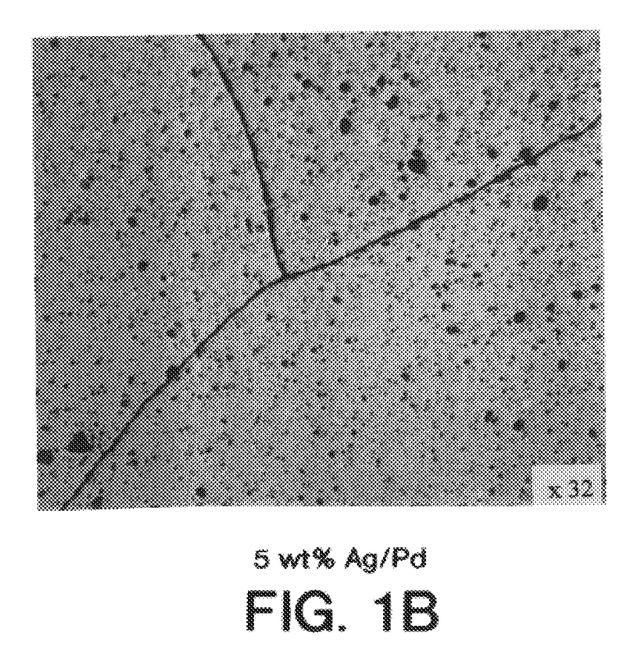
Figure 1C:
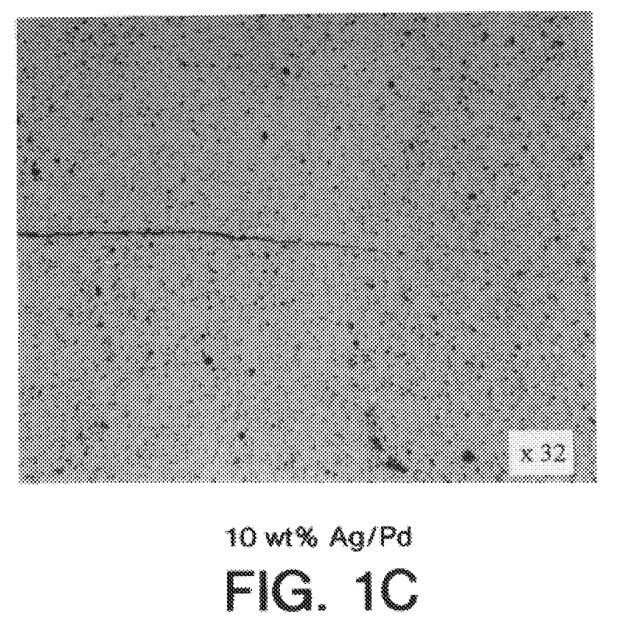
Figure 1D:
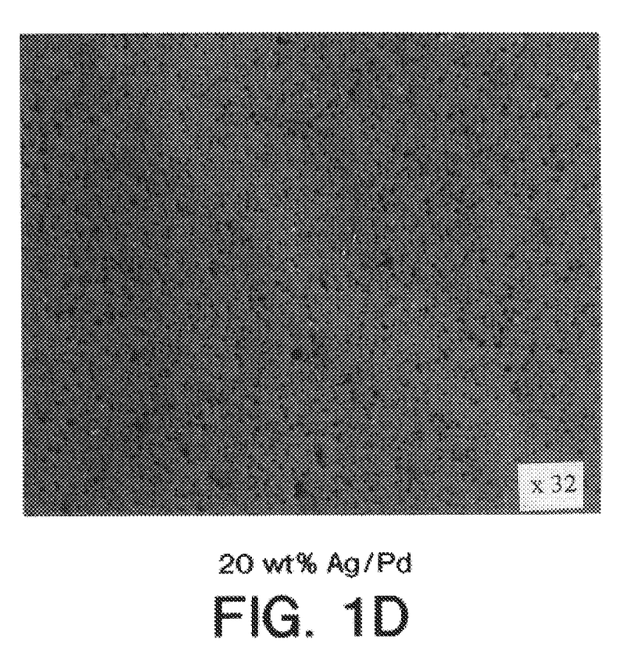
Figure 2:
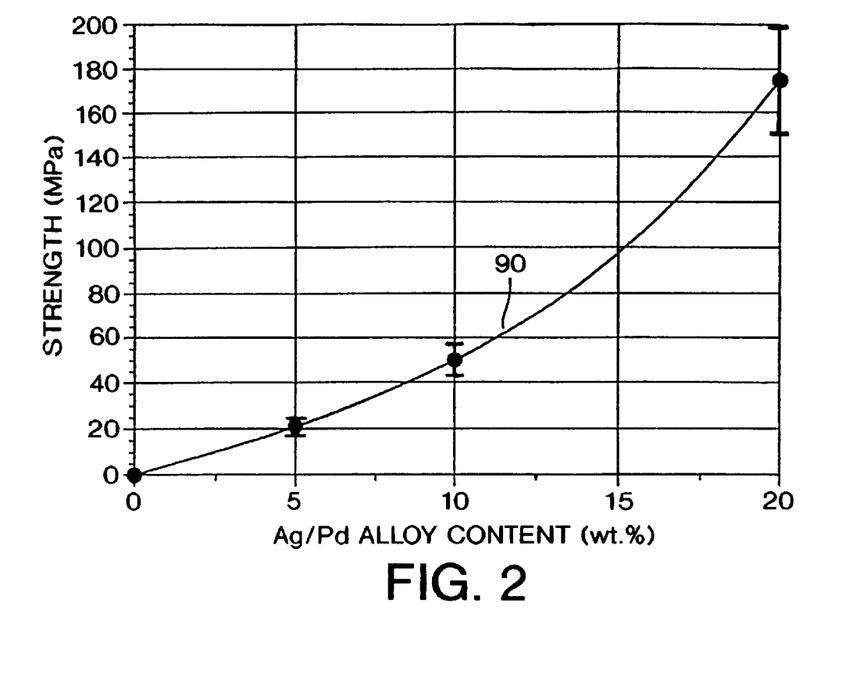
FIG. 2 is a graph of the fracture strengths of the four membranes shown in FIGS. 1a through 1d.
Figure 3:
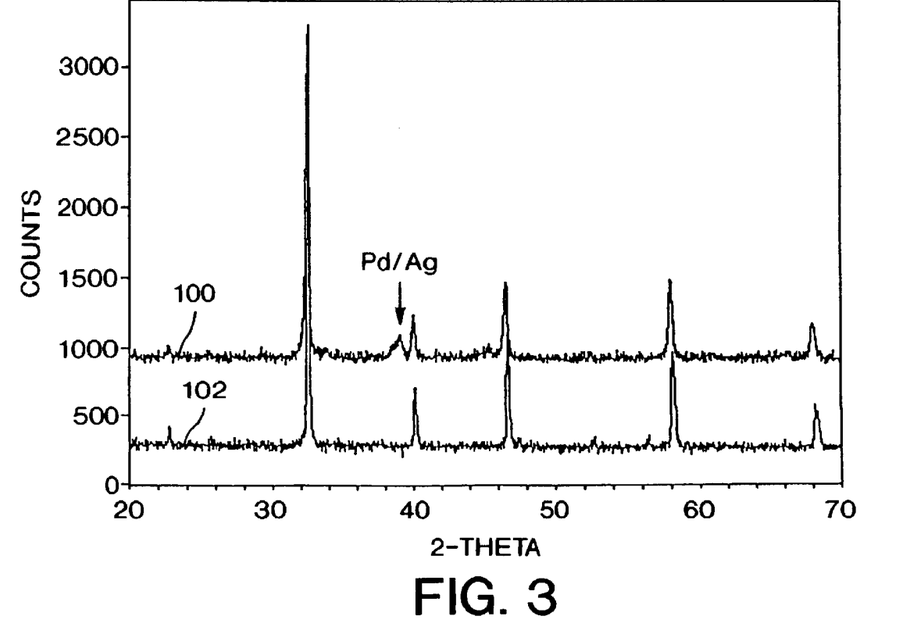
FIG. 3 is a graph of X-Ray Diffraction results for the membranes of FIGS. 1a and 1d.

The objective of the mechanically enhanced Ion Transport material is to increase the mechanical strength of the ion transport matrix and possibly eliminate the need for a nitrogen atmosphere during sintering. Our initial results show that the second phase (Ag/Pd alloy) can relieve compositional and other stresses generated during sintering, inhibit the propagation of micro-cracks in the mixed conductor phase and hence improve the mechanical strength of the ion transport material disc. FIG. 1 shows the crack density of the sintered ion transport material disc can be greatly reduced by increasing the amount of the second phase. The effect of the second phase concentration on the fracture strength of the ion transport material by 3-point bending tests is shown as curve 90 in FIG. 2. The results show the fracture strength of the ion transport materials dramatically increase from 0 to 175 (MPa) as the second phase increase from 0 to 20 wt %. Use of the Ag/Pd alloy, appears to significantly reduce the crack density and increase the mechanical strength of the ion transport disc. This is believed to be due to the metallic phase reducing compositional stresses during sintering as well as arresting crack growth, hence the mechanical strength of dual phase ion transport disks were enhanced. The XRD results shown in FIG. 3 also demonstrate a good compatibility between the 20% Ag/Pd alloy, spectrum 100, and $La_{0.2}Sr_{0.8}Fe_{0.69}Co_{0.1}Cr_{0.2}Mg_{0.01}O_x$, spectrum 102, without any additional phase being detected at after sintering at 1200° C.

Figure 4:
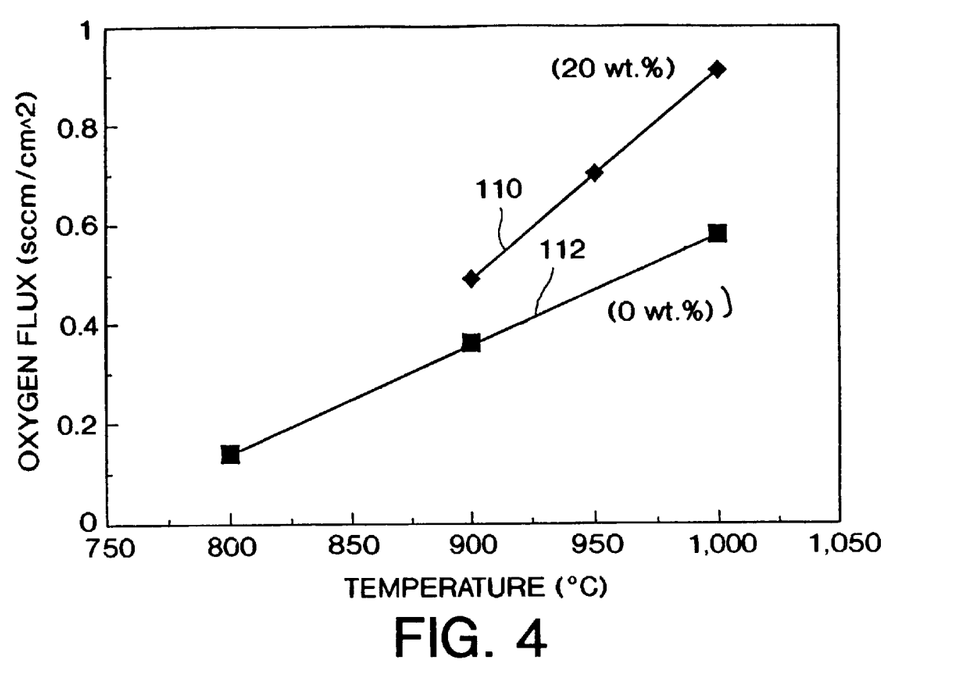
FIG. 4 is a graph of oxygen transport at different temperatures for the membranes of FIGS. 1a and 1d.

Oxygen transport tests were performed on a 0.85 mm disc at temperature of 900–1000° C. under an air/helium gradient with flow rates of 500 sccm (standard cubic centimeters per minute) for each stream at 1.2 atm pressure. The $O_2$ fluxes are 0.5, 0.7, 0.9 sccm/cm² at 900, 950, 997° C., respectively, curve 110, with the activation energy of 1.0 eV which is comparable to those obtained for single phase specimen, curve 112, as shown in FIG. 4. Therefore, the use of the second phase does not appear to diminish the oxygen transport performance of the material.

Figure 5:
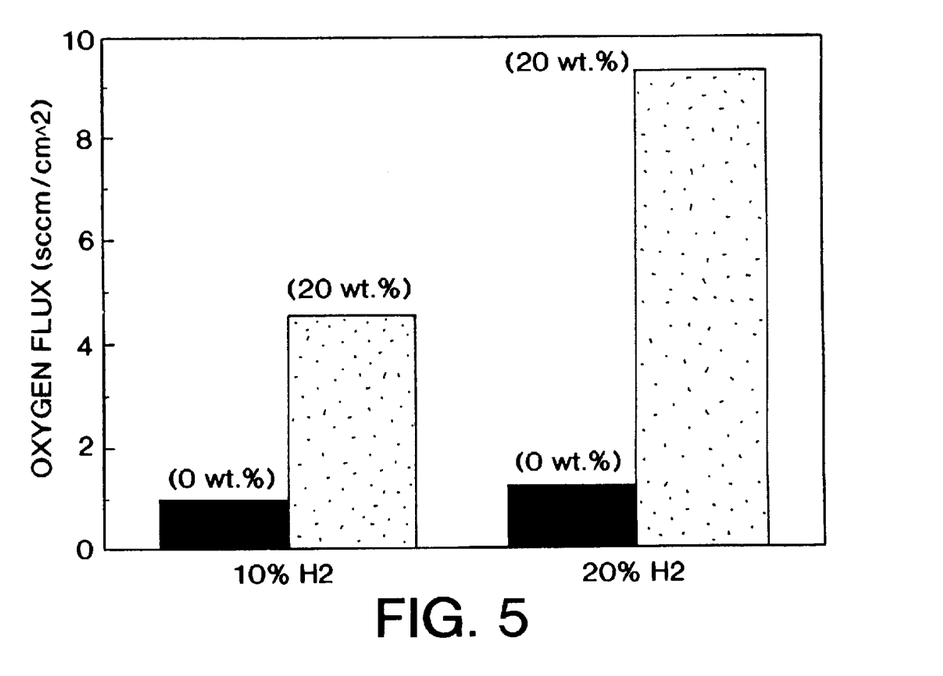
FIG. 5 is a chart of oxygen flux at different reactive purge levels for the membranes of FIGS. 1a and 1d.

Tests of these dual phase discs were also performed at 1000° C. by using different concentrations of $H_2$(10 and 20%)/$N_2$ mixtures on the purge side. As the $H_2$ concentration of the reactive side of was raised from 10% to 20%, the $O_2$ flux increased from 4.6 to 9.4 sccm/cm². As compared to the single phase tube tests, the dual phase disc also shows higher oxygen fluxes under identical reactive purge conditions, as shown in FIG. 5. This is believed to be due to the enhancement of surface oxidation kinetics due to the catalytic properties of the second phase.

EXAMPLE II

Figure 6A:
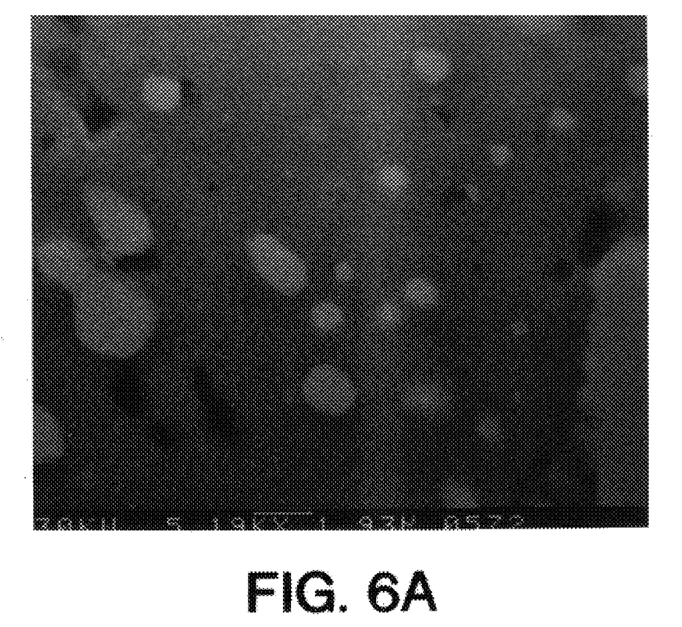
FIG. 6a is a scanning electron micrograph of another membrane according to the present invention.
Figure 6B:
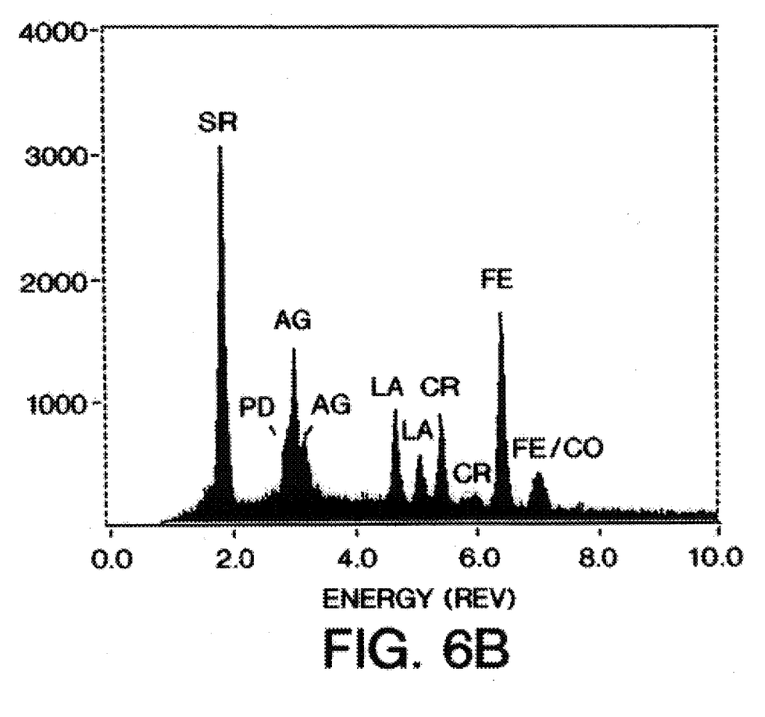

Mechanically Enhanced Ion Transport Membrane of $La_{0.2}Sr_{0.8}Fe_{0.69}Co_{0.1}Cr_{0.2}Mg_{0.01}O_x$ and 65Ag/35Pd Alloy A dense dual phase disc of $La_{0.2}Sr_{0.8}Fe_{0.69}Co_{0.1}Cr_{0.2}Mg_{0.01}O_x$ with 20% 65Ag/35Pd (65 wt % Ag and 35 wt % Pd) was prepared according to the method of Example I except that 65Ag/35Pd is substituted for 50Ag/50Pd as a second phase. Room temperature $N_2$ permeation test confirmed that the disc is gas-tight. The scanning electron micrograph (FIG. 6a) shows at 5180× magnification a well dispersed second phase in the $La_{0.2}Sr_{0.8}Fe_{0.69}Co_{0.1}Cr_{0.2}Mg_{0.01}O_x$ matrix and reveals neither delaminations nor any additional phase formation indicating the good compatibility between the Ion Transport and the second phase. Surface EDS (energy dispersed spectroscopy) spectrum (FIG. 6b) of the specimen also shows minimal compositional losses of the matrix as well as the second phase after sintering. The Pd to Ag ratio of the second phase after sintering (0.548) is close to that of the 65Ag/35Pd alloy (0.538) within the accuracy of the instrument. The disc also showed good mechanical strength after sintering at 1200° C. in air with no microcracks being observed. Oxygen transport test was performed on a 0.9 mm disc at temperature of 1000° C. under an air/helium gradient. The $O_2$ flux was 0.8 sccm/cm² at 1000° C. which is comparable to that of dual phase specimen in Example I (with 20 wt % of 50Pd/50Ag second phase). The reactive purge test of this disc was also performed at 1000° C. by using 10% $H_2$-90% $N_2$ mixture on the purge side. An $O_2$ fluxes of 4.5 sccm/cm² was obtained at 1000° C. which is also comparable to that of dual phase specimen with 20 wt % of 50/Pd/50Ag alloy.

EXAMPLE III

Mechanically Enhanced Ion Transport Membrane of $La_{0.2}Sr_{0.8}Fe_{0.69}Co_{0.1}Cr_{0.2}Mg_{0.01}O_x$ and 90Ag/10Pd Alloy Dense dual phase discs of $La_{0.2}Sr_{0.8}Fe_{0.69}Co_{0.1}Cr_{0.2}Mg_{0.01}O_x$ with 20 wt % 90Ag/10Pd were prepared according to the method of Example 1 except that 90Ag/10Pd (supplied by Praxair Surface Technologies, Inc.) was substituted for 50Ag/50Pd as a second phase. The discs and bars were prepared by dry pressing under a pressure of 10.4 kpsi followed by binder burn-out (1° C./min from 25 to 400° C. and hold for 1 hour), and sintered at 1200° C. for 1 hour with a heating/cooling rate of 2° C./min in air. Although there was no microcracks observed in these specimens, they showed lower mechanical strengths (with an average of 135 Mpa) as compared to those of dual phase specimens with 20 wt % of 50Pd/50Ag alloy. This may be due to a lower tensile strength of 90Ag/10Pd alloy as compared to that of 50Pd/50Ag alloy. Oxygen transport tests were performed on extruded tubes (10 cm long, 1 cm I.D., 1 mm wall thickness after sintering) at temperature of approximately 1000° C. under reactive purge tests using variety of purge gases. The $O_2$ fluxes are slightly lower (~10–15%) than those of dual phase tubes with 50Pd/50Ag alloy under similar testing conditions. An $O_2$ flux of 2.2 sccm/cm$^2$ at 1025° C. was obtained with purge-gas containing 60% $CH_4$ for these tubes.

Referring to suitable first phase materials more generally, microcracking is often present in a $ABO_3$ perovskite structure, or a structure that can be derived from that (e.g. brownmillerite, $A_2B_2O_5$), as a result of a phase transition during the sintering and cooling. The microcracks are reduced in the $La_{0.2}Sr_{0.8}Fe_{0.69}Co_{0.1}Cr_{0.2}Mg_{0.01}O_x$ perovskite by adding the various amount of Ag/Pd second phase as shown in Example I and II. The invention disclosed herein is intended to cover suitable mixed conducting oxides presented by the structure $A_rA'_sA''_tB_uB'_vB''_wO_x$ where A,A',A'' are chosen from the Groups 1, 2, 3 and the F block lanthanides; and B,B',B' are chosen from the D block transition metals according to the Periodic Table of the Elements adopted by the IUPAC wherein $0 < r \leq 1, 0 \leq s \leq 1, 0 \leq t \leq 1, 0 < u \leq 1, 0 \leq v \leq 1, 0 \leq w \leq 1$, and x is a number which renders the compound charge neutral. Preferably, A,A' or A'' of the enumerated structure is a Group 2 metal selected from the group consisting of magnesium, calcium, strontium and barium. Preferred mixed conducting oxides are presented by the formula: $A_sA''_tB_uB'_vB''_wO_x$ wherein A represents a lanthanide, Y, or mixture thereof, A' represents an alkaline earth metal or mixture thereof; B represents Fe; B' represents Cr, Ti, or mixture thereof and B'' represents Mn, Co, V, Ni, Cu or mixture thereof and s, t, u, v and w each represents a number from 0 to about 1.

Suitable first phase materials also include other ion-conducting ceramics in which microcracks may occur during sintering due to a high temperature polymorphic symmetry change, a compositional stress or a highly anisotropic thermal expansion coefficient. For example, zirconia exhibits phase transformations at 1170° C. (monoclinic to tetragonal) and 2370° C. (tetragonal to cubic). The high temperature polymorphic symmetry changes usually result in cracks during sintering. Therefore, zirconia is usually stabilized in the fluorite-type cubic phase by introducing an appropriate di- or trivalent oxide to obtain the cubic symmetry. The invention herein is also intended to cover mechanical enhancement of other ceramics such as zirconia or ceria if they encounter a high temperature polymorphic symmetry change, a compositional stress or a highly anisotropic thermal expansion coefficient. Further, an electronic/ionic conductor such as $(B-MgLaCrO)_{0.5}(YSZ)_{0.5}$, or a primarily ionic conductor such as zirconia or ceria combined with a perovskite, may be further combined with a constituent according to the present invention to form a membrane having at least three phases.

Specific features of the invention are shown in one or more of the drawings for convenience only, as each feature may be combined with other features in accordance with the invention. Alternative embodiments will be recognized by those skilled in the art and are intended to be included within the scope of the claims. For example, suitable first phase materials may conduct proton ions instead of or together with oxygen ions for applications involving hydrogen.

What is claimed is:

1. A solid electrolyte ion transport membrane comprising:
   a matrix material which conducts at least one type of ion; and
   at least one non-metallic constituent which is physically distinguishable from said matrix material and which enhances at least one of the mechanical properties, the catalytic properties and the sintering behavior of the matrix material, said constituent being present within said matrix material and not establishing continuous electronic conductivity through said constituent across the membrane.

2. The membrane of claim 1 wherein said matrix material is a mixed conductor which exhibits both electronic and oxygen ion conductivity.

3. The membrane of claim 1 wherein said constituent is a ceramic material.

4. The membrane of claim 3 wherein said ceramic material is selected from the group consisting of a praseodymium-indium oxide mixture, a titanium oxide, a niobium-titanium oxide mixture, a nickel oxide, a tungsten oxide, a tantalum oxide, ceria, zirconia, magnesia, and a mixture thereof.

5. The membrane of claim 1 wherein said constituent is in the form of non-metallic fibers.

6. The membrane of claim 1 wherein said matrix material includes a first phase having a structure represented by the formula:
   $La_{1-x}Sr_xCu_{1-y}M_yO_{3-d}$
   wherein M represents Fe or Co;
   x equals from zero to about 1;
   y equals from zero to about 1; and
   d equals a number that satisfies the valences of La, Sr, Cu and M in the formula.

7. A solid electrolyte ion transport membrane comprising:
   a matrix material including a first phase having structure represented by the formula:
   $La_{1-x}Sr_xCu_{1-y}M_yO_{3-d}$
   wherein M represents Fe or Co;
   x equals from zero to about 1;
   y equals from zero to about 1; and
   d equals a number that satisfies the valences of La, Sr, Cu and M in the formula; and
   at least one constituent which is physically distinguishable from said matrix material and which enhances at least one of the mechanical properties, the catalytic properties and the sintering behavior of the matrix material, said constituent being present within said matrix material and not establishing continuous electronic conductivity through said constituent across the membrane.

8. The membrane of claim 7 wherein said constituent is a metal.

9. The membrane of claim 8 wherein said metal is present in a manner below the percolation limit of electrons across said membrane.

10. The membrane of claim 8 wherein said metal is present below about 30 percent by volume of the membrane.

11. The membrane of claim 7 wherein said constituent is selected from the group consisting of silver, palladium, platinum, gold, rhodium, ruthenium, tungsten, tantalum, titanium, nickel, silicon, lanthanide, yttrium, copper, cobalt, chromium, vanadium, zirconium, tantalum, manganese, molybdenum, niobium, aluminum, iron and mixtures thereof.

\* \* \* \* \*